(12) United States Patent
Jin et al.

(10) Patent No.: US 8,108,928 B2
(45) Date of Patent: Jan. 31, 2012

(54) ADAPTIVE TRAITOR TRACING

(75) Inventors: Hongxia Jin, San Jose, CA (US);
Jeffrey Bruce Lotspiech, Henderson, NV (US); Nimrod Megiddo, Palo Alto, CA (US); Michael Joseph Nelson, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/143,658

(22) Filed: Jun. 20, 2008

(65) Prior Publication Data

US 2009/0319227 A1    Dec. 24, 2009

(51) Int. Cl.
*G06F 11/00* (2006.01)
*G06F 17/30* (2006.01)
*H04L 9/00* (2006.01)

(52) U.S. Cl. .............................. 726/22; 726/26; 713/165

(58) Field of Classification Search .......... 380/200–203; 726/22–26, 31–32; 713/176, 189, 193–194; 705/51
See application file for complete search history.

(56) References Cited

U.S. PATENT DOCUMENTS

| | | | |
|---|---|---|---|
| 4,041,249 A | 8/1977 | Matz et al. |
| 4,634,807 A | 1/1987 | Chorley et al. |
| 4,694,491 A | 9/1987 | Horne et al. |
| 4,864,616 A | 9/1989 | Pond et al. |
| 5,058,162 A | 10/1991 | Santon et al. |
| 5,065,429 A | 11/1991 | Lang |
| 5,081,677 A | 1/1992 | Green et al. |
| 5,177,791 A | 1/1993 | Yeh et al. |
| 5,247,497 A | 9/1993 | Cohn |
| 5,272,752 A | 12/1993 | Myers et al. |
| 5,345,505 A | 9/1994 | Pires |
| 5,412,723 A | 5/1995 | Canetti et al. |
| 5,592,552 A | 1/1997 | Fiat |
| 5,598,470 A | 1/1997 | Cooper et al. |
| 5,636,276 A | 6/1997 | Brugger |
| 5,651,064 A | 7/1997 | Newell |
| 5,668,873 A | 9/1997 | Yamauchi |
| 5,680,457 A | 10/1997 | Bestler et al. |
| 5,708,632 A | 1/1998 | Totsuka et al. |
| 5,734,719 A | 3/1998 | Tsevdos et al. |
| 5,754,648 A | 5/1998 | Ryan et al. |
| 5,754,649 A | 5/1998 | Ryan et al. |
| 5,796,824 A | 8/1998 | Hasebe et al. |
| 5,910,987 A | 6/1999 | Ginter et al. |
| 5,949,885 A | 9/1999 | Leighton |

(Continued)

FOREIGN PATENT DOCUMENTS

WO    WO 99/19822    4/1999

(Continued)

OTHER PUBLICATIONS

U.S. Appl. No. 12/131,073, filed May 31, 2008, Bellwood et al.

(Continued)

*Primary Examiner* — Hosuk Song
(74) *Attorney, Agent, or Firm* — Donald L. Wenskay; Mohammed Kashef

(57) ABSTRACT

One embodiment of the present invention includes a method for traitor tracing that selects a probability distribution for the assignment of file-segment variations in a digital file. This probability distribution is selected to improve traceability for a particular size of a coalition of attackers. At least one symbol for each file-segment variation is then distributed based on the selected probability distribution.

20 Claims, 7 Drawing Sheets

U.S. PATENT DOCUMENTS

| | | | |
|---|---|---|---|
| 6,020,883 | A | 2/2000 | Herz et al. |
| 6,061,451 | A | 5/2000 | Muratani et al. |
| 6,118,873 | A | 9/2000 | Lotspiech |
| 6,134,201 | A | 10/2000 | Sako et al. |
| 6,209,092 | B1 | 3/2001 | Linnartz |
| 6,285,774 | B1 | 9/2001 | Schumann et al. |
| 6,289,455 | B1 | 9/2001 | Kocher et al. |
| 6,347,846 | B1 | 2/2002 | Nakamura |
| 6,370,272 | B1 | 4/2002 | Shimizu |
| 6,381,367 | B1 | 4/2002 | Ryan |
| 6,434,535 | B1 | 8/2002 | Kupka et al. |
| 6,442,108 | B1 | 8/2002 | Kurihara et al. |
| 6,442,626 | B1 | 8/2002 | Smola et al. |
| 6,535,858 | B1 | 3/2003 | Blaukovitsch et al. |
| 6,556,679 | B1 | 4/2003 | Kato et al. |
| 6,563,937 | B1 | 5/2003 | Wendt |
| 6,587,949 | B1 | 7/2003 | Steinberg |
| 6,604,072 | B2 | 8/2003 | Pitman et al. |
| 6,609,116 | B1 | 8/2003 | Lotspiech |
| 6,636,966 | B1 | 10/2003 | Lee et al. |
| 6,738,878 | B2 | 5/2004 | Ripley et al. |
| 6,760,445 | B1 | 7/2004 | Schwenk et al. |
| 6,760,539 | B2 | 7/2004 | Asada et al. |
| 6,775,779 | B1 | 8/2004 | England et al. |
| 6,802,003 | B1 | 10/2004 | Gross et al. |
| 6,832,319 | B1 | 12/2004 | Bell et al. |
| 6,839,436 | B1 | 1/2005 | Garay et al. |
| 6,856,997 | B2 | 2/2005 | Lee et al. |
| 6,857,076 | B1 | 2/2005 | Klein |
| 6,888,944 | B2 | 5/2005 | Lotspiech et al. |
| 6,901,548 | B2 | 5/2005 | Hattori et al. |
| 6,912,634 | B2 | 6/2005 | Ripley et al. |
| 6,947,563 | B2 | 9/2005 | Fagin et al. |
| 6,999,947 | B2 | 2/2006 | Utsumi et al. |
| 7,010,125 | B2 | 3/2006 | Lotspiech et al. |
| 7,031,884 | B1 * | 4/2006 | Radulovic et al. ............ 702/189 |
| 7,036,024 | B2 | 4/2006 | Watson |
| 7,039,803 | B2 | 5/2006 | Lotspiech et al. |
| 7,046,808 | B1 | 5/2006 | Petrovic et al. |
| 7,057,993 | B2 | 6/2006 | Barnard et al. |
| 7,082,537 | B2 | 7/2006 | Muratani |
| 7,120,901 | B2 | 10/2006 | Ferri et al. |
| 7,155,591 | B2 | 12/2006 | Ripley et al. |
| 7,162,646 | B2 | 1/2007 | Wu et al. |
| 7,240,200 | B2 | 7/2007 | Lotspiech et al. |
| 7,283,633 | B2 | 10/2007 | Asano et al. |
| 7,296,159 | B2 | 11/2007 | Zhang et al. |
| 7,305,711 | B2 | 12/2007 | Ellison et al. |
| 7,319,752 | B2 | 1/2008 | Asano et al. |
| 7,346,169 | B2 | 3/2008 | Asano et al. |
| 7,380,132 | B2 | 5/2008 | Sako et al. |
| 7,380,137 | B2 | 5/2008 | Bell et al. |
| 7,392,392 | B2 | 6/2008 | Levy |
| 7,913,306 | B2 * | 3/2011 | Apap et al. ...................... 726/24 |
| 2002/0003881 | A1 | 1/2002 | Reitmeier et al. |
| 2002/0044320 | A1 | 4/2002 | Pfeiffer et al. |
| 2002/0104001 | A1 | 8/2002 | Lotspiech et al. |
| 2002/0141582 | A1 | 10/2002 | Kocher et al. |
| 2003/0070083 | A1 | 4/2003 | Nessler |
| 2003/0169885 | A1 | 9/2003 | Rinaldi |
| 2003/0220921 | A1 | 11/2003 | Fagin et al. |
| 2004/0034787 | A1 | 2/2004 | Kitani |
| 2004/0098593 | A1 | 5/2004 | Muratani |
| 2004/0111611 | A1 | 6/2004 | Jin et al. |
| 2004/0128259 | A1 | 7/2004 | Blakeley et al. |
| 2004/0133794 | A1 | 7/2004 | Kocher et al. |
| 2004/0153941 | A1 | 8/2004 | Muratani |
| 2005/0021568 | A1 | 1/2005 | Pelly et al. |
| 2005/0097110 | A1 | 5/2005 | Nishanov et al. |
| 2005/0141704 | A1 | 6/2005 | Van Der Veen |
| 2005/0283610 | A1 | 12/2005 | Serret-Avila et al. |
| 2006/0056695 | A1 | 3/2006 | Wu et al. |
| 2006/0085343 | A1 | 4/2006 | Lisanke et al. |
| 2006/0136728 | A1 | 6/2006 | Gentry et al. |
| 2006/0239503 | A1 | 10/2006 | Petrovic et al. |
| 2006/0282676 | A1 | 12/2006 | Serret-Avila et al. |
| 2007/0067242 | A1 | 3/2007 | Lotspiech et al. |
| 2007/0067244 | A1 | 3/2007 | Jin et al. |
| 2007/0165853 | A1 | 7/2007 | Jin et al. |
| 2007/0174637 | A1 | 7/2007 | Lotspiech et al. |

FOREIGN PATENT DOCUMENTS

| | | |
|---|---|---|
| WO | WO 00/48190 | 8/2000 |
| WO | WO 01/22406 | 3/2001 |

OTHER PUBLICATIONS

U.S. Appl. No. 12/131,074, filed May 31, 2008, Lotspiech.
U.S. Appl. No. 12/131,076, filed May 31, 2008, Jin et al.
U.S. Appl. No. 12/143,061, filed Jun. 20, 2008, Jin et al.
U.S. Appl. No. 12/143,658, filed Jun. 20, 2008, Jin et al.
U.S. Appl. No. 12/192,962, filed Aug. 15, 2008, Jin et al.
Boneh et al., "Fully collusion resistant traitor tracing with short cipher texts and private keys," Eurocrypt '06, 2006, http://citeseer.ist.psu.edu./boneh06fully.html.
Celik et al., "Collusion-resilient fingerprinting using random prewarping," Image Processing, 2003, ICIP 2003, Proceedings, 2003 International Conference vol. 1, Sep. 14-17, 2003 pp. I-509-I-512, vol. 1.
Deguillaume et al., "Countermeasures for unintentional and intentional video watermarking attacks," Conference SPIE—Int. Soc. Opt. Eng. (USA), Jan. 24-26, 2000, vol. 3971, p. 346-357.
Fernandez-Munoz et al., "Fingerprinting schemes for the protection of multimedia distribution rights," Upgrade, Security in e-Commerce, v. III, n. 6, pp. 36-40, Dec. 2002, http://www.cepis-upgrade.org/issues/2002/6/upgrade-vIII-6.pdf.
Hagiwara et al., "A short random fingerprinting code against a small number of pirates" Applied Algebra, Algebraic Algorithms and Error-Correcting Codes, 16th International Symposium, AAEECC-16. Proceedings (Lecture Notes in Computer Science vol. 3857) pp. 193-202 (Feb. 2-24, 2006).
Kocher et al., "Self-protecting digital content," Technical Report from the CRI Content Security Research Initiative, Cryptography Research, Inc. (CRI), 2002-2003, http://www.cryptography.com/resources/whitepapers/SelfProtectingContent.pdf.
Pfitzmann et al., "Trials of traced traitors," (c) 1996 Workshop on Information Hiding, pp. 1-14.
Seol et al., "A scalable fingerprinting scheme for tracing traitors/colluders in large scale contents distribution environments," Intelligent Systems Design and Applications, 2005. ISDA 2005, Proceedings, 5th International Conference Sep. 8-10, 2005 pp. 228-233.
Silverberg et al., "Application of list decoding to tracing traitors," a version of this paper appeared in ASIACRYPT 2001, 2001, http://www.math.unl.edu/-jwalker/papers/taipp.pdf.
Tardos G., "Optimal probabilistic fingerprint codes," Proceedings of the 35th Annual ACM Symposium on Theory Computing, 2003, pp. 116-125.
Zhu et al., "Analysis on AACS traitor tracing against mix-and-match attacks," IEEE CCNC 2008, p. 1097.

* cited by examiner

ADAPTIVE TRAITOR TRACING

BACKGROUND

The present invention relates to content-protection systems, and more specifically, to traitor tracing of anonymous attacks.

The transition of many types of media from analog to digital offers new advantages to the consumer in quality and flexibility. Also, there is an increasing use of global distribution systems such as the Internet for the distribution of digital assets, including music, film, computer programs, photographs, games and other content. These trends have made it easy to produce and distribute flawless copies of content by content providers. Unfortunately, there is also a concurrent increase in the unauthorized copying, or pirating, of digital content, which has caused considerable economic losses to content providers. Effective countermeasures are important to the viability of businesses engaged in the distribution of digital media.

Piracy is a major concern and expense for content providers. To this end, industry consortia such as the 4C Entity (<www.4centity.com>) and AACSLA (<www.aacsla.com>) have been formed. These groups are licensing agencies that provide content protection tools based on Content Protection for Recordable Media (CPRM) and Advanced Access Content System (AACS), respectively. CPRM is a technology developed and licensed by the 4C group, comprising IBM, Intel, Matsushita, and Toshiba, to allow consumers to make authorized copies of commercial entertainment content where the copyright holder for such content has decided to protect it from unauthorized copying. AACS is a follow-on technology for the same purpose, under development by a group comprising IBM, Intel, Matsushita, Toshiba, Sony, Microsoft, Warner Brothers, and Disney.

In the AACS content protection system, devices such as DVD players are assigned a set of keys and a common key is used to encrypt the content. A pirate attack in this system may occur when the attackers redistribute the common content encrypting key or the plain content to avoid being identified. This type of an attack is called an anonymous attack. In an anonymous attack, an attacker, or group of attackers, tries to hide their secret device keys and operate anonymously. In this attack, the attackers instrument their devices and collude to build a pirate copy of the decrypted plaintext content or the decryption key itself. The attackers can then redistribute either the plaintext content, or the decryption key.

The devices (or the owners of the devices) who are involved in the piracy and redistribution are called "traitors." Traitor tracing is the forensic technology used to identify the traitors who have been involved in the piracy attack. To do traitor tracing for anonymous attacks, content may be divided into multiple segments and some of the segments may be chosen to have multiple variations. A digital watermark is one way to build these variations. More importantly, those variations are not only differently watermarked, but also differently encrypted. During playback, each device can only decrypt exactly one variation at each segment. The differently watermarked and encrypted variations effectively build different content versions. Each different playback path becomes one version. The recovered pirated variation encrypting keys, or the movie version, can be linked back to the actual devices (i.e., traitors) who were assigned those versions.

There are some practical issues with the above-described traitor-tracing system. First of all, because the variations take extra space on the disc (bandwidth) during communication, the number of variations cannot be large. However, in practice, the number of devices a system needs to accommodate may be very large, e.g., in the billions. These are conflicting requirements. To address this issue some prior systems utilize two level of assignment, namely "inner code" and "outer code". The inner code assigns the variation for each segment inside the content, which may be a movie. This assignment effectively creates multiple movie versions, each version becoming a symbol for the outer code assignment. The outer code assigns the movie versions (symbols) among a sequence of movies. This assignment solves the extra-bandwidth requirement by having a small number of variations at each segment, while still managing to support a large number of devices.

A second practical issue relates to the actual traitor detection. The problem is that attackers collude in the attack and may mislead the tracing agency to erroneously incriminate innocent devices. The collusion attack creates an inherent difficulty in terms of tracing. After the above-described practical assignment is done, a straightforward approach to detect colluders might be to score every device and incriminate the highest scoring devices. In some prior systems, more efficient tracing algorithms are employed which use a set-cover algorithm to detect coalitions of pirates all together instead of one by one. In these systems, when the number of traitors becomes large, the traceability decreases. Hence, prior-art systems using a set-cover tracing algorithm may work fine when the number of traitors is smaller than q, with q being the number of symbol variations. When the number of traitor exceeds q, the traceability degrades significantly. When the number of traitor reaches q log q, where the coalition gets to know every symbol, the scheme may be nearly broken.

SUMMARY

According to one embodiment of the present invention, a method comprises: selecting a probability distribution for the assignment of file segment variations in a digital file, the probability distribution improving traceability for a particular size of a coalition of attackers; and distributing at least one symbol for each file segment variation based on the selected probability distribution.

According to another embodiment of the present invention, a method comprises: selecting a probability distribution for the assignment of file segment variations in a digital file playable on a device, said probability distribution minimizing the number of digital files necessary to trace a particular size of a coalition of attackers; and distributing at least one symbol for each file segment variation based on the selected probability distribution; recovering pirated digital files; detecting the coalition of attackers.

According to a further embodiment of the present invention, a system comprises: digital media; a digital file on the digital media, having a plurality of file segment variations; traitor tracing enabling component on the digital media, the traitor-tracing enabling component assigning a symbol for each file segment variation, wherein the symbol is assigned using a probability distribution which improves traceability for a particular size of a coalition of attackers.

According to another embodiment of the present invention, a computer-program product for traitor tracing, comprises: a computer-usable medium having computer usable program code embodied therewith, the computer usable program code comprising: computer-usable program code configured to: select a probability distribution for the assignment of file segment variations in a digital file, the probability distribution improving traceability for a particular size of a coalition of attackers; and distribute at least one symbol for each file-segment variation based on said selected probability distribution.

DETAILED DESCRIPTION

Embodiments of the invention provide an adaptive and efficient way to perform traitor tracing of pirated digital content. The present invention can perform traitor tracing where the number of traitors is relatively large, for example larger than q, the number of symbol variations. In this way, the present invention raises the tracing limit on the number of traitors as compared to prior traitor-tracing systems.

The present invention, in some embodiments, may also adaptively assign the symbols in the inner code so as to maximize the traceability for a traitor size. Traditionally, for a segment in the movie to have multiple variations, the symbols assigned to the variations are equally likely to appear. With the present invention the equal probable assignment of the symbols is modified so that any kind of probability assignment, including nonuniform probability assignments, may be used.

The present invention may achieve significant advantages over the prior art. First, it enables the tracing agency to adaptively assign the symbols with a particular probability, as needed, in order to achieve superior (even potentially maximum) traceability for any traitor size. Secondly, with the unequal probability assignment of the symbols, the traitor size limit is pushed much further. For example, the present invention can achieve good traceability when traitor size exceeds q, and it continues doing well even after the coalition size reaches q log q.

To do traitor tracing for anonymous attacks, content is divided into multiple segments and some of the segments are chosen to have multiple variations. To save extra space needed for those variations, two levels of assignment may be used, namely "inner code" and "outer code", collectively called "super codes". The inner code assigns the variation for each segment inside a piece of content, e.g., a movie. This assignment effectively creates multiple movie versions, and each version becomes a symbol for the outer code assignment. The outer code assigns the movie versions (symbols) to players for a sequence of movies.

Figure 1:
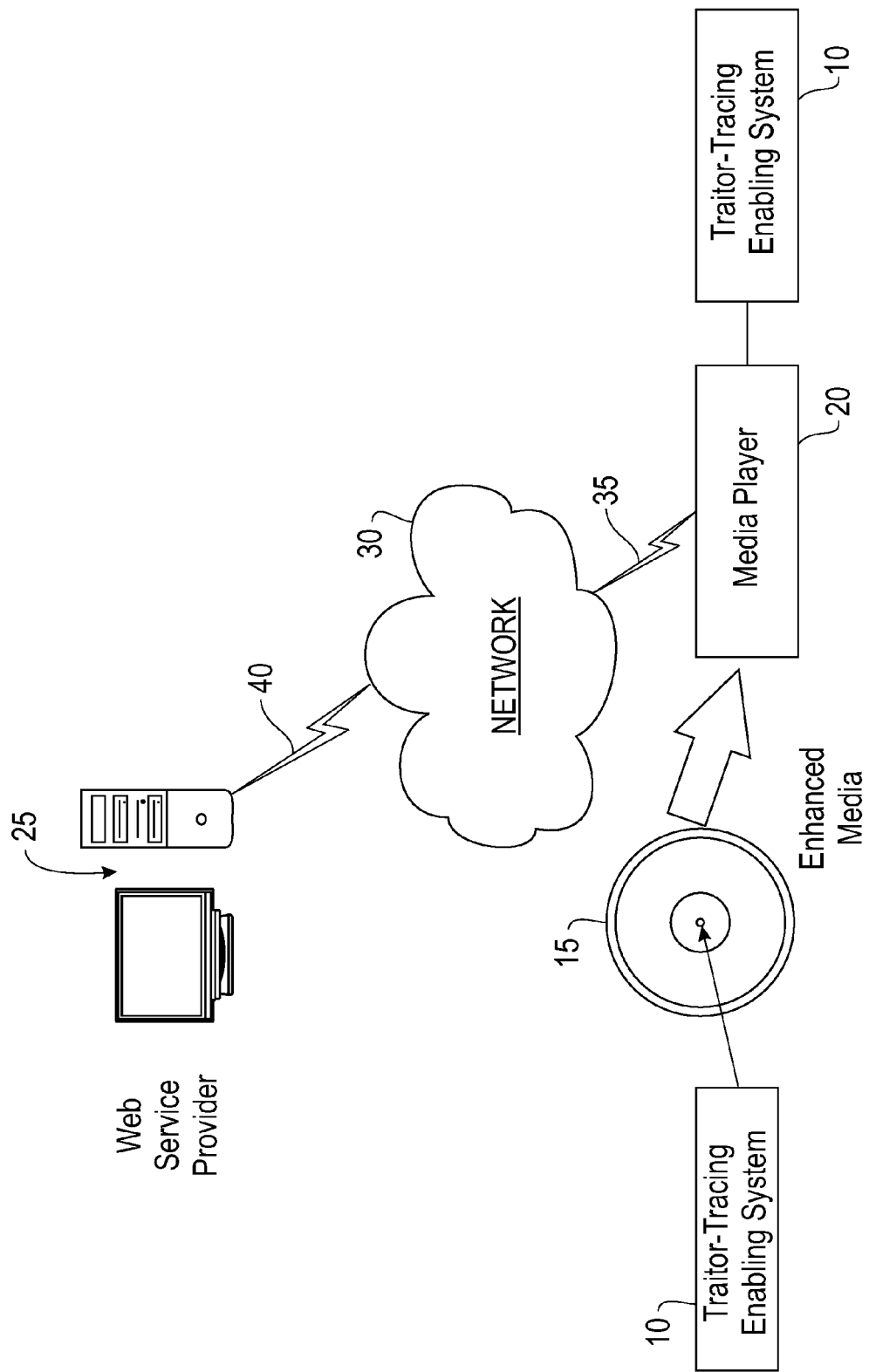
FIG. 1 is a diagram of an exemplary operating environment in which embodiments of a traitor-tracing system of the present invention can be used.

In more detail, referring now to FIGS. 1-5, the use of inner and outer codes is shown. FIG. 1 shows an exemplary overall environment in which a system, method, and service for adaptive traitor tracing may be used according to embodiments of the invention. System 10 comprises a software programming code or a computer program product that is typically embedded within, or installed on a media 15 and a media player 20. Alternatively, system 10 can be saved on a suitable memory or storage medium such as a diskette, a CD, a DVD, a hard drive, or like devices.

The media player 20 can access a web service provider 25 through a network 30. The media player 20 comprises software that allows the media player 20 to interface securely with the web service provider 25. The media player 20 is connected to network 30 via a communications link 35 such as telephone, cable DSL, satellite link, etc. The web service provider 25 is connected to the Internet through a communications link 40. The media player 20 downloads content from the web service provider 25 and records the content on the media 15. Alternatively, media 15 may be prerecorded with content such as, for example, movies, audio files, video games, computer programs, or any other type of electronic file. Media 15 may be played on the media player 20. Content on media 15 comprises one or more files.

Figure 2:
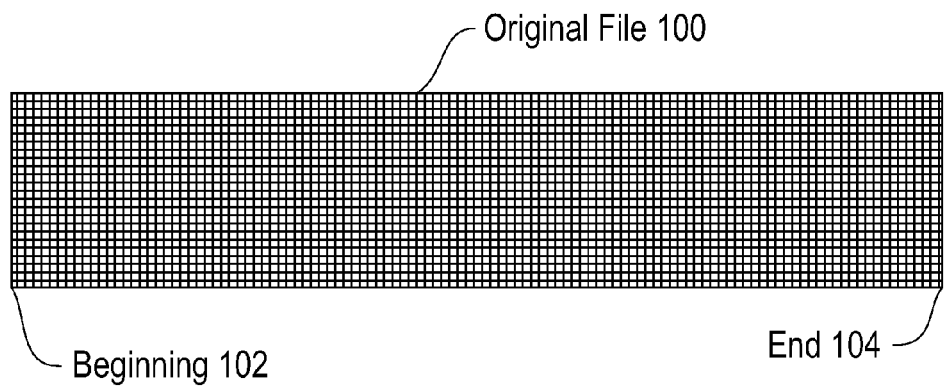
FIG. 2 is a diagram of an original file, according to an embodiment of the present invention.

FIG. 2 shows a diagram of an original file 100, according to an embodiment of the present invention. Files may comprise any kind of digital data sequence, including but not limited to text, audio, images, video, music, movies, multimedia presentations, operating systems, software applications, and cryptographic keys. In broad terms, file 100 includes a beginning 102, an end 104, and a span of data. Files 100 may be of any size and may be distributed by any means, including but not limited to computer networks, satellite networks, cable networks, television transmissions, and various physical storage media (e.g. CD-ROMs, DVDs, tapes, etc.) as are known in the art. Files 100 may be broadcast in groups in a substantially continuous sequence.

The present invention may be applied to any digital content subject to one-to-many distribution. Movie rental boxes are one application. Another example may be for operators of a web server (generally referred to as a digital rights manager) that sells copyrighted content such as music, or other material stored in a subscription database, who may not want to encrypt or otherwise process files on the fly because of the computational expense involved. Similarly, such a server can neither individually tailor nor store a complete copy of every file it transmits.

Figure 3:
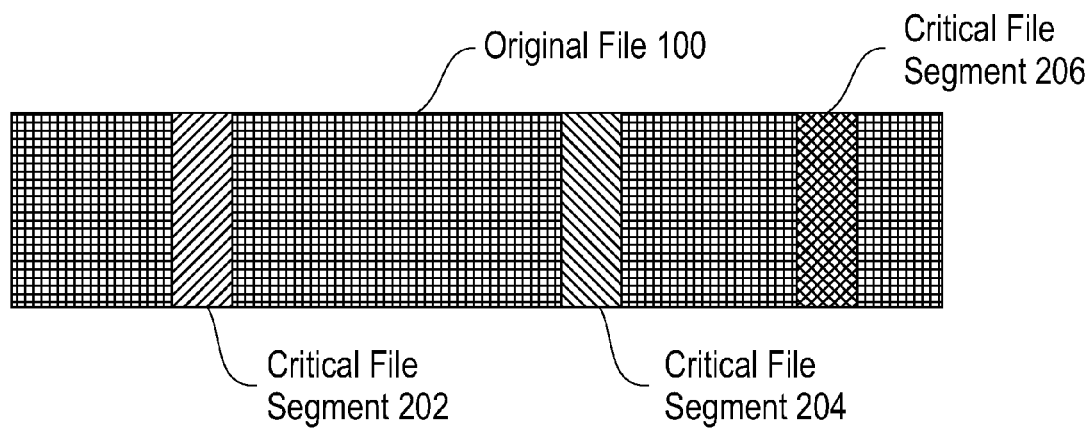
FIG. 3 is a diagram of a critical file segment in an original file, according to an embodiment of the present invention.

Referring now to FIG. 3, a diagram of critical file segments 202, 204, and 206 in an original file are shown, according to an embodiment of the present invention. For clarity, only three critical file segments are shown; a typical number may be approximately 16. Not all data in a file 100 need to be protected to the maximum-possible level of security; bandwidth can be conserved by selectively applying different levels of security to the most valuable portions of a file 100. For example, when the file comprises a movie, each movie may have scenes that are each absolutely essential for the movie to be acceptable to any audience. All critical file segments in a file must therefore be properly processed for the file to be commercially desirable. Embodiments of the present invention may select five-second scenes in a typical movie as critical file segments, but critical file segments of varying length are also encompassed by the present invention. The critical file segments are not necessarily equally distributed throughout a given file, in fact the critical file segments are preferably especially selected based on the contents of the file, possibly by human editors. In the case of executable software files, automated tools may identify critical file segments according to a measured execution frequency.

Figure 4A:
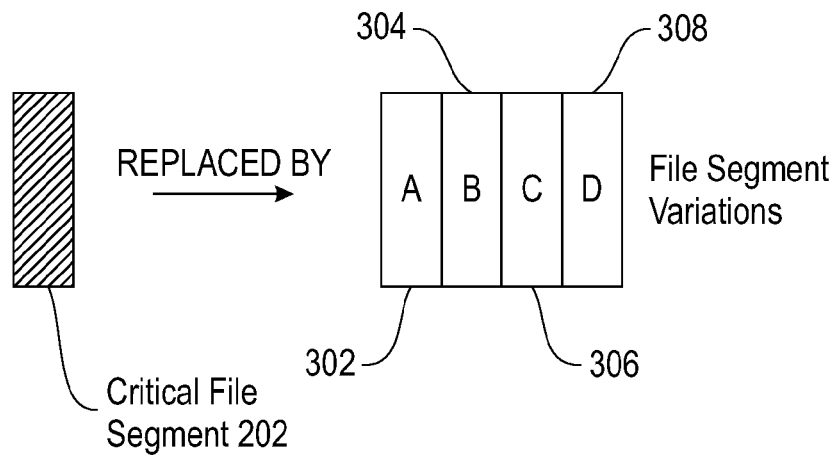
FIGS. 4A, 4B, and 4C are diagrams of file segment variations that will replace critical file segments, according to an embodiment of the present invention.
Figure 4B:
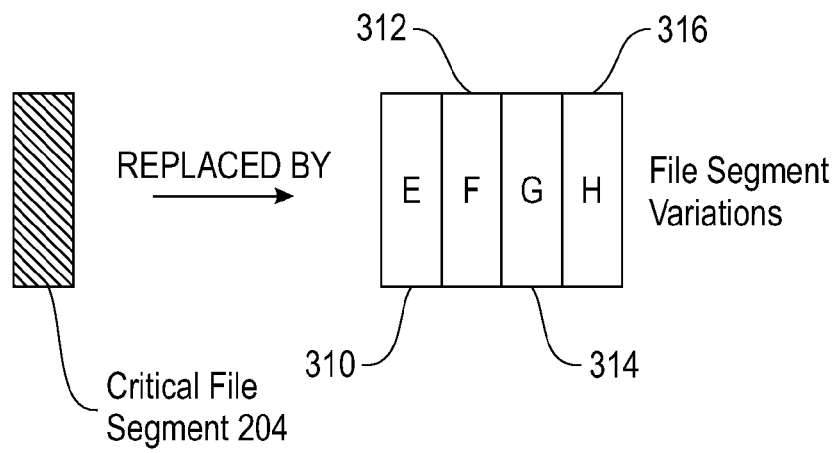
Figure 4C:
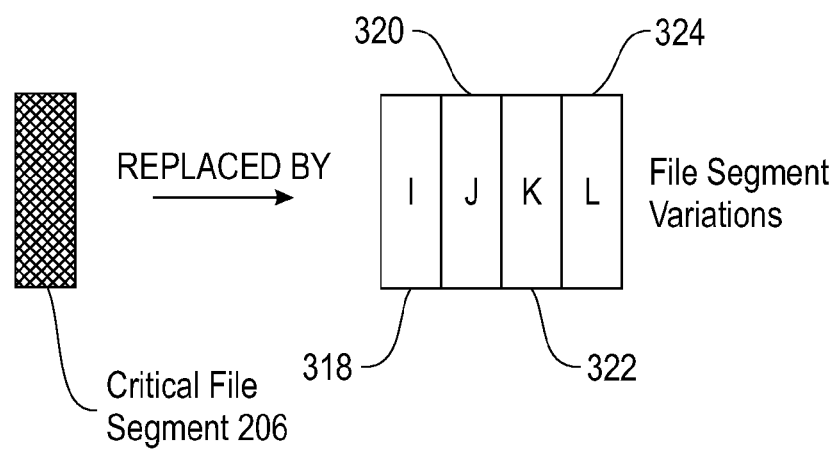

Referring now to FIGS. 4A, 4B and 4C, diagrams of file segment variations 302-324 that will replace critical file segments 202-206 are shown, according to an embodiment of the present invention. For clarity, only four file segment variations are shown for each critical file segment; a typical number may be approximately 16. Each file-segment variation is simply a copy of the particular corresponding critical file segment that has been differently watermarked and differently encrypted. Each entire file is also typically watermarked and encrypted in a broadcast encryption system. Each file-segment variation is identified by a text designation in this application (e.g. A, B, C . . . etc.) for clarity, but in practice binary numbers are generally employed for this purpose.

The number of critical file segments and the number of file segment variations employed may depend on the properties of the file and its audience. For movies, one could select a single critical file segment and have several hundred file-segment variations; however, attackers may simply choose to omit that single critical file segment in a pirated copy of the file, in hopes that viewers would not find such a glitch to be overly annoying. A pirated movie with, say 15 missing critical 5-second scenes is probably going to be too annoying to any viewer for it to be of any commercial value. Thus, the illegally-broadcast movies are either substantially disrupted or the attackers must incorporate some of their file segment variations, which would facilitate traitor tracing.

While the number of critical file segments and the number of file-segment variations may be kept constant for each file, modifying either number according to an estimated piracy likelihood for a given file is also within the scope of the invention. The number of file segments and the number of file-segment variations will determine the amount of bandwidth overhead (or, alternately, the increased size of the broadcast version of the file). In a typical movie, use of 15 critical file segments each having 16 file segment variations each of 5 seconds' duration adds roughly 10% to the file size.

Figure 5:
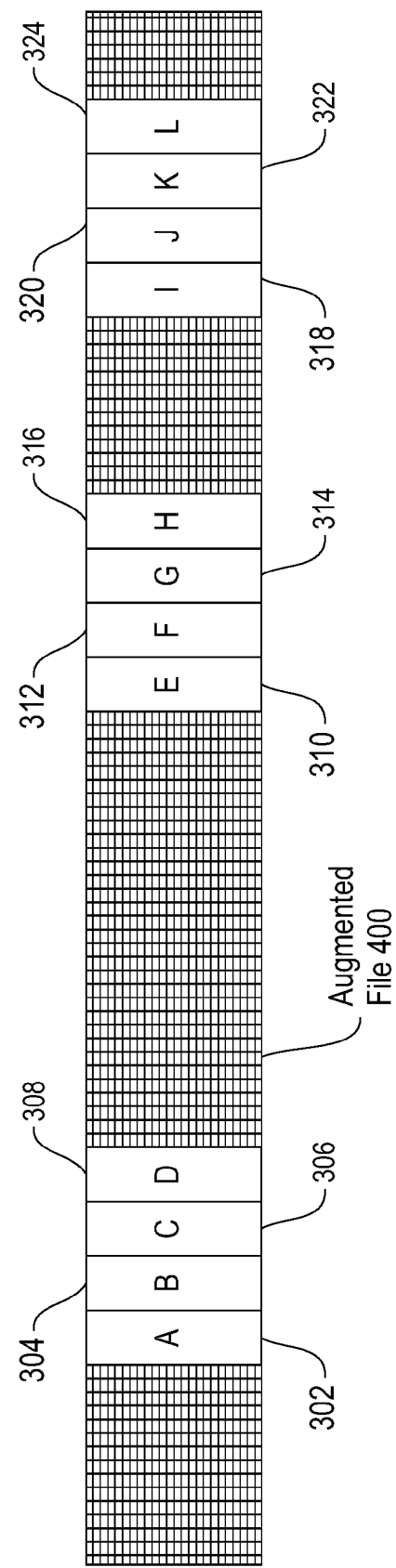
FIG. 5 is a diagram of an augmented version of a file including file segment variations, according to an embodiment of the present invention.

Referring now to FIG. 5, a diagram of an augmented file 400 including file segment variations 302-324 is shown, according to an embodiment of the present invention. The augmented file 400 is the version of the original file 100 that will actually be broadcast. Each intended receiver of the broadcast of a group of files requires augmentation-selection information to choose a particular combination of file-segment variations for each particular file. For example, a movie player must know, for each movie, which set of variations to plug into the spaces where critical scenes existed in the original movie. The particular arrangement of unmodified file content and file segment variations within the augmented file 400 shown is not critical but merely intuitive.

The techniques employed by the present invention facilitate traitor tracing in a commercially-viable (i.e. low-bandwidth overhead) manner. If a pirated version of a file is found, say on the Internet, the identity of the particular movie rental box or players that were used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file-segment variations to use, an analysis of a pirated file can help determine which boxes were used as part of an anonymous attack.

In the event that all of the file-segment variations in a redistributed version of a file match the combination of file-segment variations assigned to only a single movie rental box or player, some prior-art systems would normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated. From the attackers' point of view, the ideal situation is if they redistribute movies including variations such that an innocent third party appears to be the culprit. Such redistribution may not occur right away, but may follow a so-called "delayed attack". This complicates the task of traitor tracing, and emphasizes the need to prevent all attacks as much as possible for every broadcast. Watermarks in the file-segment variations are used to determine which variations have been rebroadcast.

Embodiments of the invention perform two complementary tasks: choosing which file-segment variation to employ at each critical file segment of each file for each receiver box, and upon observing a redistributed file or decryption keys, identifying (and preferably subsequently disabling) traitors with the assistance of variation-assignment information. Additional details of traitor tracing using inner and outer codes may be found in U.S. patent application Ser. No. 10/315,395, entitled "Method for Tracing Traitors and Preventing Piracy of Digital Content in a Broadcast Encryption System", filed on Dec. 9, 2002, which is hereby incorporated by reference it its entirety.

When a content-protection system like AACS deploys this layered code, it can be made flexible by only fixing the outer code into devices and leaving the inner code completely flexible. One example of a flexible traitor-tracing system is described in U.S. patent application Ser. No. 11/231,174, entitled "System and Method for Assigning Sequence Keys to a Media Player to Enable Flexible Traitor Tracing", filed on Sep. 19, 2005, which is hereby incorporated by reference in its entirety. In this system only the outer code is used to assign the tracing keys to put into device, and the inner code can vary from movie to movie. In other words, how to assign the variations to each movie segment can be a movie-by-movie decision.

Embodiments of the present invention comprise a method of assigning variations to each movie segment that maximizes the number of colluders that the set-cover tracing algorithm can tolerate. This method can be used to determine the inner code of the two-level code used by AACS, or to create a code for similar traitor-tracing systems that are based on set cover, be it a one-level code, or a level of code in a multi-level code, or multiple level codes as a whole supercode.

In a set-cover tracing algorithm, the smallest set of players that are able to decrypt the set of recovered pirated movies is found—this set of players is referred to as a "cover" of the pirated movies. Then, the probability of at least one of the players in the cover being guilty is computed. This "guilt probability" should be very close to 1 in order to have confidence that some of the players in the cover are guilty. The guilt probability is a function of several variables, including the number of movies covered, but in particular is a function of the probability distribution used to assign codewords in the inner code and the number of pirated movies.

In general, the guilt probability increases as the number of recovered movies increases. The number of movies needed to have high confidence that the cover contains guilty players is the measure of traceability. The number of movies should be as small as possible in order to identify traitors quickly so they can be prevented from pirating any further movies.

In one embodiment, the present invention utilizes the following three steps:

1. Select a probability distribution of file-segment variations that maximizes or approximately maximizes traceability (minimizes the number of movies necessary) for a particular coalition size, and distribute the symbols assigned to the file-segment variations based on this distribution.

2. Recover pirated movies and detect traitors.

3. Based on the gained information on the coalition size, repeat steps 1-2.

Note that step 1 depends on which strategy attackers use and which detection algorithm the license agency uses. In one embodiment, step 2 may be performed using the set-cover tracing algorithm described in U.S. patent application Ser. No. 11/323,247, entitled "Method for Tracing Traitor Coalitions and Preventing Piracy of Digital Content in a Broadcast Encryption System", filed on Dec. 30, 2005, which is hereby incorporated by reference in its entirety.

In the following discussion of how step 1 can be carried out, it may be assumed that the traitors are using a random mix-match strategy, which means that each variation used in the pirated movies is selected at random from amongst the variations held by the coalition of traitors. We then describe how to maximize the traceability for this mix-match attack. The invention, however, is not limited to the random mix-match attack. The concept of using nonuniform probability distributions can be applied to other pirate strategies and the traceability (approximately) maximized for any fixed strategy.

In one embodiment of the invention, the variation for each outer code symbol (or each player in the case of a one-level code) may be assigned independently for each segment. Variation i is assigned with probability $p_i$. The following is one procedure for choosing the values of these probabilities in step 1 described above. There are two primary steps to this procedure:

1a. Given a maximum number of colluders T, and the number of distinct symbols q, compute the probability that a cover of size T will contain at least one guilty player. This probability will be a function of the assignment probabilities $\{p_i | 1 \leq i \leq q\}$ used to assign variations to codewords.

1b. Find a set of probability values $\{p_i | 1 \leq i \leq q\}$ that maximizes the probability computed in step 1a.

Step 1a will now be described in more detail. Suppose there are T colluders and q distinct variations per segment. First consider the guilt probability of a cover for a one-level code in which a variation for each segment is assigned independently to each player. This case is simpler, as the two-level case requires additional terms because of a dependence relationship with the outer code. Nevertheless, it turns out that the same process can be applied to the two-level case.

Let $p_c$ denote the probability that there exists a completely innocent coalition of size T that covers all of m recovered movie segments. The guilt probability by definition is at least $1-p_c$. Formula 1 below gives an upper bound on the probability $p_c$.

$$p_c \leq \text{Choose}(N,T)^*[\text{Sum}\{1 \leq i \leq q\}(p_i \times (1-(1-p_i)^T))]^m \quad \text{(Formula 1)}$$

where N represents the total number of players and Choose (N,T) represents the number of subsets of size T of a set of N players. This formula is derived from a union bound over all possible subsets of innocent players. The summation represents the probability that a particular subset of T innocent users would cover one variation in the pirated movies, $p_i$ being the probability that the pirates choose variation i if they use a random mix-match strategy and $1-(1-p_i)^T$ being the probability that one or more of the T innocent users is also assigned to variation i. Taking the product of this summation for the m different recovered segments results in the exponent of m.

For step 1b), all approaches to obtain the set of probabilities $\{p_i | 1 \leq i \leq q\}$ are within the scope of this invention. Some embodiments may use approximate probabilities, while other embodiments may use exact probabilities $\{p_i | 1 \leq i \leq q\}$. In practice, it is possible to use commercial software like MATLAB to obtain the set of probabilities $\{p_i | 1 \leq i \leq q\}$. In one embodiment, we can calculate the exact set of probabilities as follows. We know for any value of m, Formula 1 is strictly increasing as a function of the summation term. Thus, to minimize $p_c$ and maximize the guilt probability we must minimize the summation. The calculation may be carried out as follows.

The optimization problem is to find a probability distribution represented by nonnegative numbers $p_1, \ldots, p_q$ such that $p_1 + \ldots + p_q = 1$, so as to minimize the sum:

$$\text{Sum}\{1 \leq i \leq q\} f(p_i),$$

where $$f(x) = x \times [1-(1-x)^T].$$

The derivative is $$f'(x) = 1 + (1-x)^{T-1} \times [x(T+1)-1].$$

If $(p_1, \ldots, p_q)$ is an optimal probability distribution, then there exists a number u such that for every i, $f'(p_i) \geq u$ and if $p_i > 0$, then $f'(p_i) = u$. The maximum of $f'(x)$ is attained at $x^* = 2/(T+1)$, and its value is $f'(x^*)$ $1+[(T-1)/(T+1)]^{T-1}$. For large T, the value of $f'(x^*)$ is approximately 1.135. If $0 \leq u \leq 1$, then the equation $f'(x) = u$ has a unique solution, and if $1 < u < f'(x^*)$, then that equation has two solutions. This implies that at the optimal distribution $(p_1, \ldots, p_q)$ there are at most two distinct values of $p_i$. If there is only one value, then $p_1 = \ldots = p_q = 1/q$. In that case the value of the solution is $$q \times f(1/q) = 1-(1-1/q)^T.$$

If $q < T+1$, then $f'(1/q) > 1$, and there may be a better distribution with two distinct values, for example, $p_1 = \ldots = p_r = a$ and $p_{r+1} = \ldots = p_q = b$ so that $r \times a + (q-r) \times b = 1$ and $$1/(T+1) < a \leq 2/(T+1) \leq b.$$

The optimal solution may be found as follows. Let d denote the precision with which a will be evaluated. The values $a_j = 1/(T+1) + j \times d$, may be scanned for $j=1, \ldots, 1/[(T+1)d]$. For each $a_j$, the quantity $u(a_j) = f'(a_j)$ may be evaluated. Then the second solution $b_j$ of the equation $f'(x) = u(a_j)$ may be evaluated within the interval $[2/(T+2), b_{j-1}]$, where $b_{j-1}$ is the previous value of b that was computed with respect to $a_{j-1}$. Alternatively, Newton's method can be used starting from $b_{j-1}$. Given a pair $(a_j, b_j)$, a value $r_j$ may be calculated so that $r_j \times a_j + (q-r_j) \times b_j = 1$, i.e., $r_j = (q \times b_j - 1)/(b_j - a_j)$. If $r_j$ is approximately an integer between 0 and q, then this gives a candidate for an optimal solution. An optimal solution may be selected from the set of candidates that are found as described above. In general, the minimum probability is not attained when the $p_i$ are all equal. Because of this, we may say that the invention utilizes a nonuniform probability distribution to achieve improved traceability.

Figure 6:
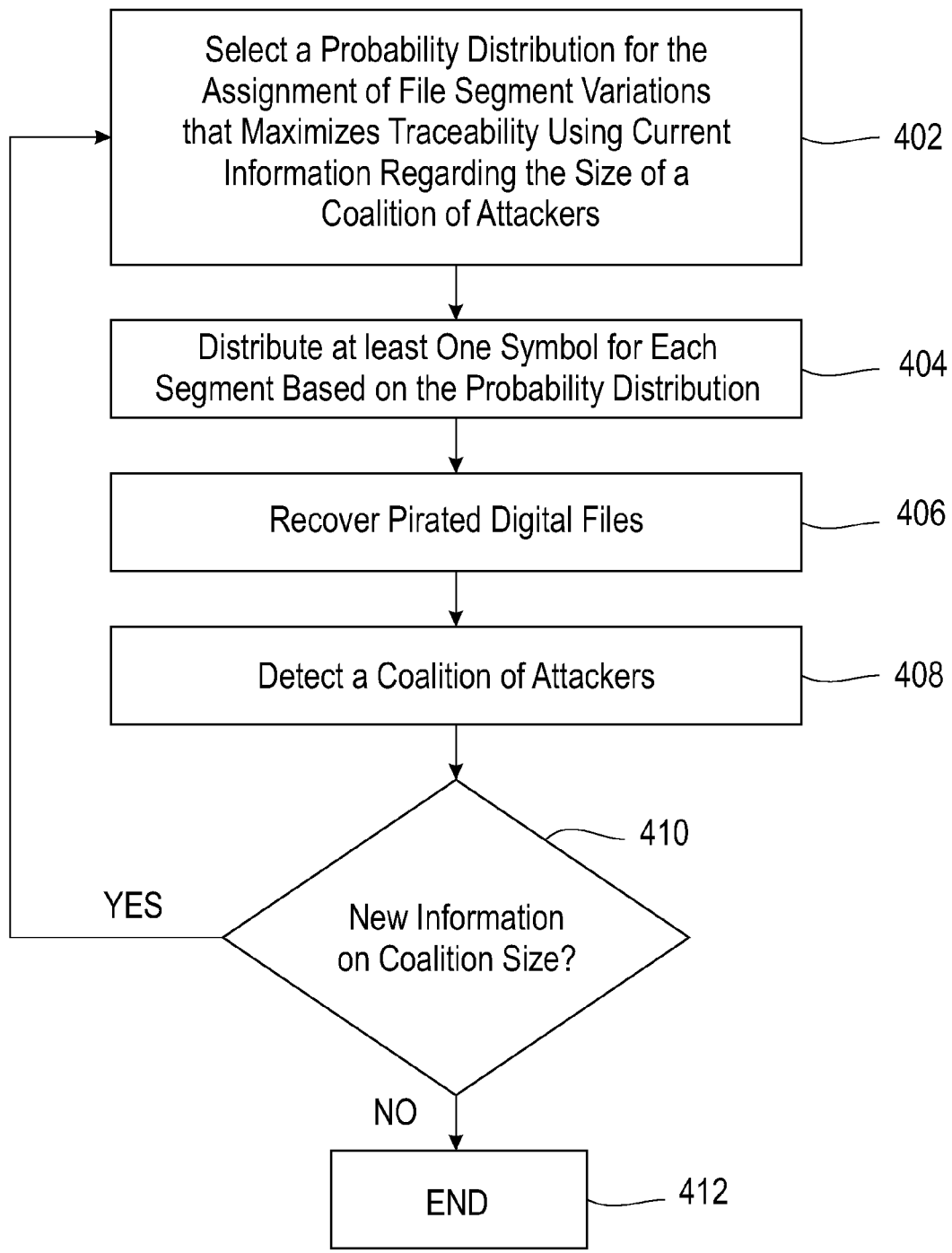
FIG. 6 is a flowchart of a method of traitor tracing in accordance with an embodiment of the invention.

FIG. 6 shows a flowchart of a process 401 for adaptive traitor tracing in accordance with an embodiment of the invention. In step 402, a probability distribution for the assignment of file segment variations is selected using the above-described techniques. In particular, the probability distribution selected is one that maximizes traceability using the current information regarding the size of a coalition of traitors. In step 404, at least one symbol is distributed for each segment based on this probability distribution. Pirated digital files are recovered in step 406. The coalition of attackers is then detected using the above-described techniques in step 408. In step 410 the size of the coalition is determined using the detected information regarding the coalition of attackers. In step 410, a determination is made as to whether new information has been derived from the above steps. If the answer is yes, the process 401 returns to step 402 and this new size information is used in the next selection of probability distributions in step 402. The process 401 ends at 412 if step 410 determines that no new information regarding the size of the coalition has been derived.

Figure 7:
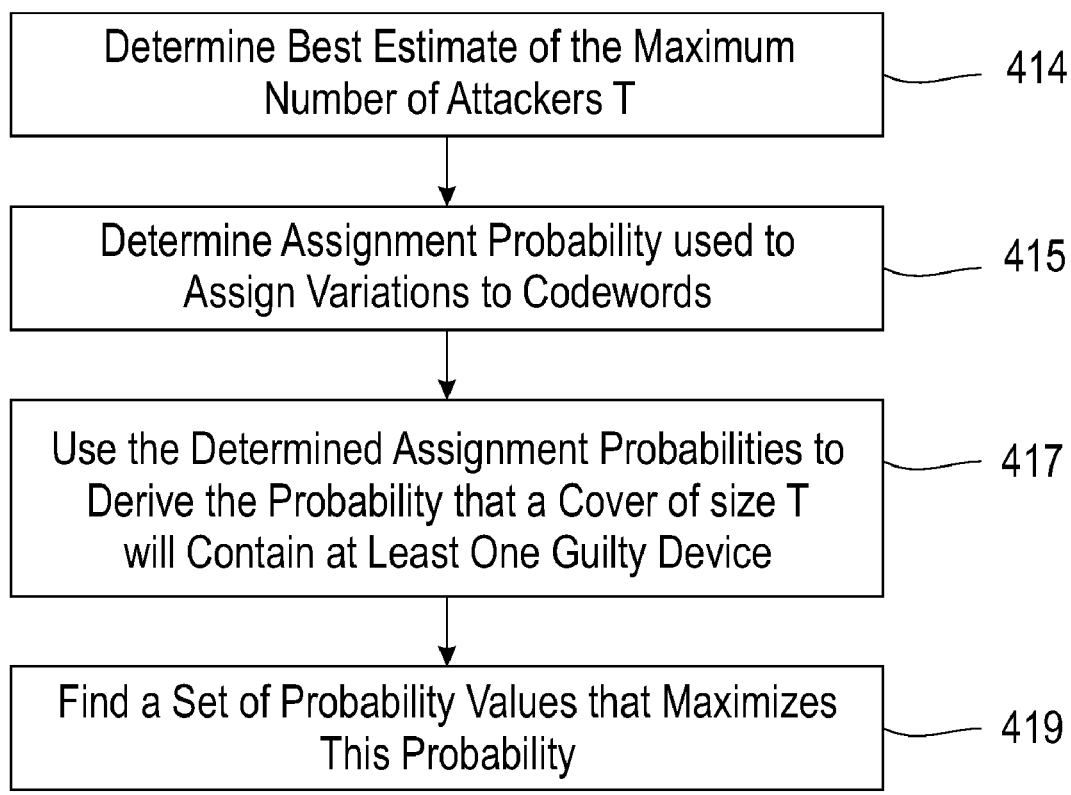
FIG. 7 is a flowchart of a method of selecting a probability distribution that maximizes traceability.

FIG. 7 shows a flow chart of a process 413 for selecting the probability distribution that may be use in step 402 shown in FIG. 6. In step 414, an estimate of the number of attackers T is made using the available information. Then the assignment probabilities used to assign variations to codewords is determined in step 415. In step 417, the assignment probabilities are used to derive the probability that a cover of size T (a coalition of devices of size T that can decrypt a set of recovered pirated digital files) will contain at least one guilty device, where the guilty device has been used to generate the recovered pirated digital files. In step 419, a set of probability values is found that maximize the probability derived in step 417. In one embodiment, process 413 is performed using the techniques described above to perform steps 1a and 1b.

As mentioned above, the present invention may be applied to any level of code, such as one-level code, a level of code in a multi-level codes system or multiple level codes as a whole supercode. In the case of a two-level code (or a multi-level code), for the purpose of this invention, the code can be treated as a one-level code. For example, the correlation between adjacent segments in the same movie, caused by a multilevel code, can be ignored. Hence, the process for assigning inner-code variations is the same.

It is noted that since the value of q in the inner code is flexible, q can also be tuned to maximize the traceability.

For a different attacker strategy besides the random-mix strategy, the formula used to bound the probability $p_c$ may be different. For example, attackers may use a "no-overlap" strategy, in which they always choose to use the symbol that is not shared with other attackers in the coalition. The no-overlap attack strategy is more difficult to trace than the random-mix strategy using traditional approaches. However, the above-described techniques of the present invention will actually yield superior traceability with the no-overlap attack strategy, which makes this strategy a bad choice for attackers.

As will be appreciated by one skilled in the art, the present invention may be embodied as a system, method or computer-program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer-program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer-program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-program instructions. These computer-program instructions may be provided to a processor of a general-purpose computer, special-purpose computer, or other programmable data-processing apparatus to produce a machine, such that the instructions, which execute via the processor of the computer or other programmable data-processing apparatus, create means for implementing the functions/acts specified in the flowchart and/or block-diagram block or blocks.

These computer-program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer-program instructions may also be loaded onto a computer or other programmable data-processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block-diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
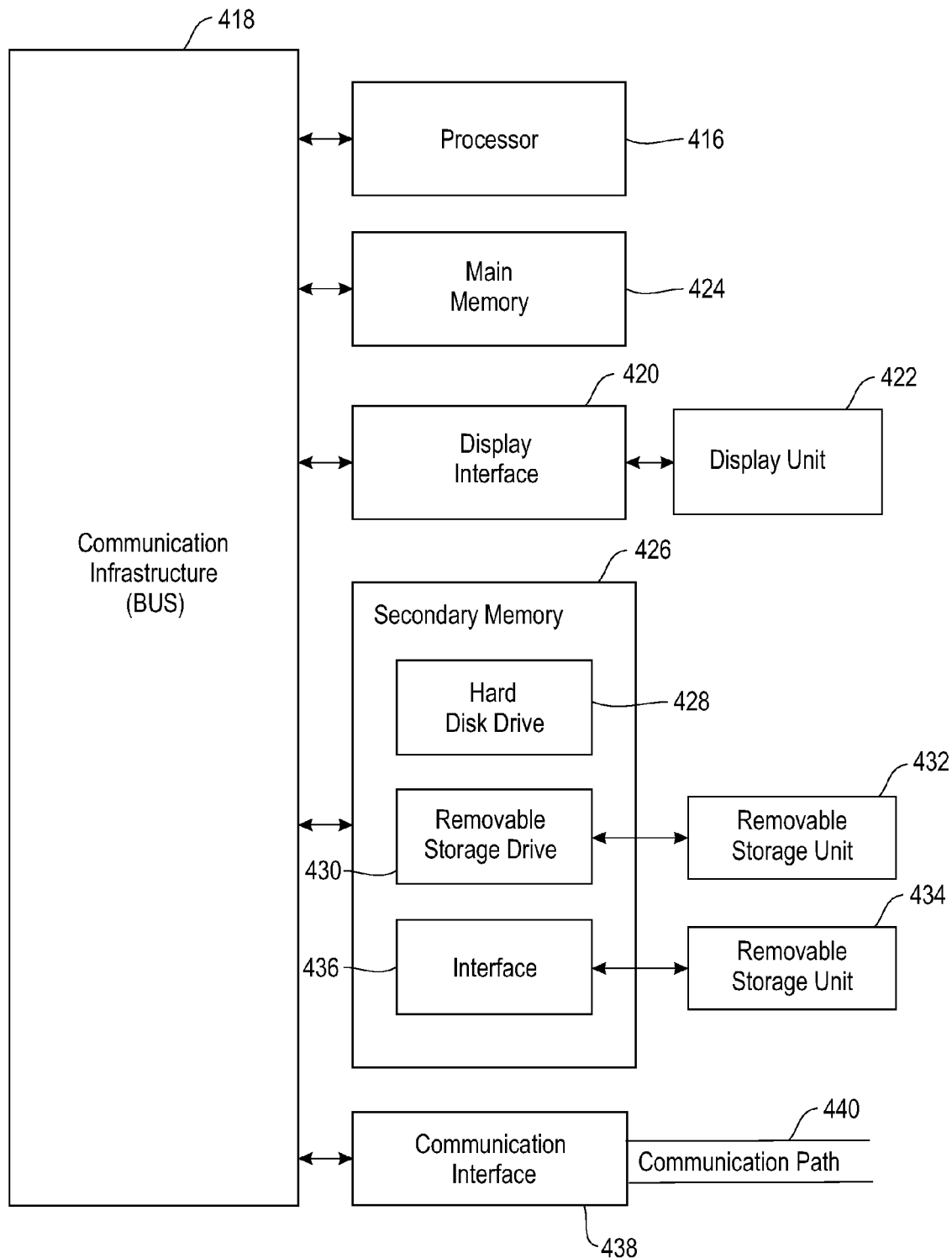
FIG. 8 is a high-level block diagram of an information processing system useful for implementing one embodiment of the present invention.

FIG. 8 is a high-level block diagram showing an information-processing system useful for implementing one embodiment of the present invention. The computer system includes one or more processors, such as processor 416. The processor 416 is connected to a communication infrastructure 418 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 420 that forwards graphics, text, and other data from the communication infrastructure 418 (or from a frame buffer not shown) for display on a display unit 422. The computer system also includes a main memory 424, preferably random-access memory (RAM), and may also include a secondary memory 426. The secondary memory 426 may include, for example, a hard-disk drive 428 and/or a removable storage drive 430, representing, for example, a floppy-disk drive, a magnetic-tape drive, or an optical-disk drive. The removable storage drive 430 reads from and/or writes to a removable storage unit 432 in a manner well known to those having ordinary skill in the art. Removable storage unit 432 represents, for example, a floppy disk, a compact disc, a magnetic tape, or an optical disk, etc., which is read by and written to by removable storage drive 430. As will be appreciated, the removable storage unit 432 includes a computer readable medium having stored therein computer software and/or data.

In alternative embodiments, the secondary memory 426 may include other similar means for allowing computer programs or other instructions to be loaded into the computer system. Such means may include, for example, a removable storage unit 434 and an interface 436. Examples of such means may include a program cartridge and cartridge interface (such as that found in video-game devices), a removable memory chip (such as an EPROM, or PROM) and associated socket, and other removable storage units 434 and interfaces 436 which allow software and data to be transferred from the removable storage unit 434 to the computer system.

The computer system may also include a communications interface 438. Communications interface 438 allows software and data to be transferred between the computer system and external devices. Examples of communications interface 438 may include a modem, a network interface (such as an Ethernet card), a communications port, or a PCMCIA slot and card, etc. Software and data transferred via communications interface 438 are in the form of signals which may be, for example, electronic, electromagnetic, optical, or other signals capable of being received by communications interface 438. These signals are provided to communications interface 438 via a communications path (i.e., channel) 440. This channel 440 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 424 and secondary memory 426, removable storage drive 430, and a hard disk installed in hard-disk drive 428.

Computer programs (also called computer control logic) are stored in main memory 424 and/or secondary memory 426. Computer programs may also be received via communications interface 438. Such computer programs, when executed, enable the computer system to perform the features of the present invention as discussed herein. In particular, the computer programs, when executed, enable the processor 416 to perform the features of the computer system. Accordingly, such computer programs represent controllers of the computer system.

From the above description, it can be seen that the present invention provides a system, computer-program product, and method for implementing the various embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising,' when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A processor-implemented method, comprising:
   selecting a probability distribution for the assignment of file-segment variations in a digital file, said probability distribution improving traceability for a particular size of a coalition of attackers, wherein said selecting comprises:
   selecting a nonuniform probability distribution,
   deriving the probability that a coalition of devices that can decrypt a set of recovered pirated digital files will contain at least one guilty device, said guilty device having been used to generate said recovered pirated digital files, and
   finding a set of probability values that maximizes said derived probability; and
   distributing at least one symbol for each said file-segment variation based on said selected probability distribution.

2. The method of according to claim 1, wherein said derived probability is a function of assignment probabilities used to assign variations to codewords.

3. The method of claim 2, further comprising:
   determining the size of said coalition of attackers.

4. The method of claim 3, further comprising:
   repeating said selecting and distributing using said determined size of said coalition of attackers instead of said particular size of said coalition.

5. The method of according to claim 1, wherein said deriving comprises deriving an upper bound on the probability that there exists an innocent coalition of size T that can decrypt said recovered pirated digital files.

6. The method of claim 5, wherein said deriving an upper bound comprises deriving:

$$p_c \leq \text{Choose}(N,T) * [\text{Sum}\{1 \leq i \leq q\}(p_i \times (1-(1-p_i)^T))]^m$$

where N represents the total number of said devices and Choose(N,T) represents the number of subsets of size T of a set of N players.

7. The method of claim 5, wherein said finding comprises:
   determining a summation term which represents the probability that a particular subset of T innocent users can decrypt one variation in said pirated digital file; and
   performing a minimizing operation on said summation term.

8. The method of claim 6, wherein said finding a set of probability values that maximizes said derived probability comprises:
   finding an exact set of probabilities by minimizing the sum:

$$\text{Sum}\{1 \leq i \leq q\} f(p_i),$$

where $f(x)=x \times [(1-(1-x)^T]$.

9. The method of claim 1 further comprising:
   recovering pirated digital files; and
   detecting said coalition of attackers.

10. The method of claim 1, wherein said digital file includes at least one of: a movie, an audio file, a video game, and a computer program.

11. The method of according to claim 1, wherein said at least one symbol is a one-level symbol representing variations in an outer-code symbol.

12. The method of claim 1, wherein said at least one symbol is a two-level code representing an inner code and an outer code.

13. A processor-implemented method, comprising:
   selecting a probability distribution for the assignment of file segment variations in a digital file playable on a device, said probability distribution minimizing the number of digital files necessary to trace a particular size of a coalition of attackers;
   distributing at least one symbol for each said file segment variation based on said selected probability distribution;
   determining a size of the coalition of attackers;
   repeating said selecting and distributing using said determined size of said coalition of attackers, instead of said particular size of said coalition;
   recovering pirated digital files; and
   detecting said coalition of attackers.

14. The method of claim 13, wherein said at least one symbol is a one-level symbol representing variations in an outer-code symbol.

15. The method of claim 13, wherein said at least one symbol is a two-level code representing an inner code and an outer code.

16. A system, comprising:
   a processor; and
   digital media in communication with said processor, wherein said digital media comprises:
   a digital file having a plurality of file-segment variations, and
   a traitor-tracing enabling component, said traitor-tracing enabling component assigning a symbol for each said file-segment variation, wherein said symbol is:
   assigned using a probability distribution which improves traceability for a particular size of a coalition of attackers, and
   selected according to a probability distribution determined by computing the probability that a coalition of devices that can decrypt a set of recovered pirated digital files will contain at least one guilty device, said guilty device having been used to generate said recovered pirated digital files and by finding a set of probability values that maximize said computed probability.

17. The system of claim 16, wherein said probability distribution is nonuniform.

18. A computer program product for traitor tracing, said computer program product comprising a non-transitory computer-usable medium having computer-usable program code embodied therewith, said computer-usable program code comprising computer-usable program code configured to:
   select a probability distribution for the assignment of file segment variations in a digital file playable on a device, said probability distribution minimizing the number of digital files necessary to trace a particular size of a coalition of attackers;
   distribute at least one symbol for each said file segment variation based on said selected probability distribution;
   determine a size of the coalition of attackers;
   repeat said select and distribute using said determined size of said coalition of attackers, instead of said particular size of said coalition;
   recover pirated digital files; and
   detect said coalition of attackers.

19. The computer-program product of claim 18, wherein said digital file includes at least one of: a movie, an audio file, a video game, and a computer program.

20. The computer-program product of claim 18, wherein said probability distribution is a nonuniform probability distribution.

* * * * *